(12) United States Patent
Meindl

(10) Patent No.: US 6,635,000 B2
(45) Date of Patent: Oct. 21, 2003

(54) ROLLER FOR A RUNNING-GEAR MECHANISM OR FOR A ROLLER BATTERY

(75) Inventor: Bernd Meindl, Hard (AT)

(73) Assignee: Innova Patent GmbH, Wolfurt (AT)

( * ) Notice: Subject to any disclaimer, the term of this patent is extended or adjusted under 35 U.S.C. 154(b) by 0 days.

(21) Appl. No.: 10/164,797

(22) Filed: Jun. 7, 2002

(65) Prior Publication Data

US 2003/0017928 A1 Jan. 23, 2003

(30) Foreign Application Priority Data

Jul. 19, 2001 (AT) .......................................... 1123/2001

(51) Int. Cl.[7] .............................................. F16C 13/00
(52) U.S. Cl. .............................. 492/39; 492/45; 492/47
(58) Field of Search ................................. 492/39, 40, 45, 492/47, 2, 1, 42; 29/895.2, 895.21, 895.213, 895.22, 895.23; 193/37; 104/229, 87, 112, 168, 197; 474/176, 177, 178, 179, 180, 181, 182, 183, 32

(56) References Cited

U.S. PATENT DOCUMENTS

| | | | | |
|---|---|---|---|---|
| 2,513,657 A | * | 7/1950 | Lindner ..................... 474/168 |
| 2,648,577 A | * | 8/1953 | Watt ........................... 384/536 |
| 2,749,133 A | * | 6/1956 | Rich ........................... 279/2.12 |
| 3,621,960 A | * | 11/1971 | Kornylak ..................... 193/37 |
| 4,571,225 A | * | 2/1986 | Lengenfelder .............. 474/176 |
| 4,633,783 A | * | 1/1987 | Feuz ........................... 104/211 |
| 5,364,202 A | * | 11/1994 | Ettelbrueck .............. 403/322.1 |
| 5,399,141 A | * | 3/1995 | Takahashi .................... 492/47 |

\* cited by examiner

Primary Examiner—Gregory Vidovich
Assistant Examiner—Marc Jimenez
(74) Attorney, Agent, or Firm—Laurence A. Greenberg; Werner H. Stemer; Ralph E. Locher

(57) ABSTRACT

The roller for a running-gear mechanism or for a roller battery in a cableway system has a roller body formed with a central bore in which a bearing is located. The roller is provided with two flanged disks and a virtually non-elastic annular support for a cable of the cableway system between the disks. One or both of the flanged disks is fastened releasably on the roller body in that the outer circumferential surface of the roller body is formed, in the region of the abutting end surface of said roller body, with at least one encircling groove for a spring ring or the like that holds the removable flanged disk on the roller body. A resilient insert is arranged between the support and at least one of the flanged disks.

9 Claims, 2 Drawing Sheets

ROLLER FOR A RUNNING-GEAR MECHANISM OR FOR A ROLLER BATTERY

BACKGROUND OF THE INVENTION

FIELD OF THE INVENTION

The invention lies in the mechanical arts. More specifically, the present invention relates to a roller for a running-gear mechanism or for a roller battery in a cableway system. The roller has a roller body formed with a central bore wherein a bearing is disposed. The roller is provided with two flanged disks between which a virtually non-elastically deformable, annular support for a cable of the cableway system is located. At least one of the flanged disks can be releasably fastened on the roller body in that the outer circumferential surface of the roller body is designed, in the region of its abutting end surface, with at least one encircling groove for a spring ring or the like.

Since it is necessary, in the case of such rollers, for the support to be continuous, the support has to be pushed onto the roller body in the axial direction. For this purpose, however, it is necessary for at least one of the two flanged disks to be fastened releasably on the roller body. For this purpose, it is known for the two flanged disks to be connected releasably to one another by means of a plurality of clamping bolts which pass through the support and the two flanged disks. Such fastening of the flanged disks, however, does not satisfy the requirements since the support is consequently weakened, as a result of which its strength and also its service life are reduced and since, in addition, the installation and removal of the supports involves high outlay.

Furthermore, it is also known for at least one encircling groove to be provided on the roller body, a spring ring being inserted into the groove. If the support here is produced from an elastic material, in particular from hard rubber, the flanged disk is pressed onto the spring ring by means of the support, as a result of which it is retained in its position.

If, however, it is necessary, on account of the very high loading to which the support is subjected, for the support to be produced from a very hard material, the support is not elastically deformable to a sufficient extent for it to press the flanged disk onto the spring ring.

SUMMARY OF THE INVENTION

It is accordingly an object of the invention to provide a roller for a running gear or for a roller battery, which overcomes the above-mentioned disadvantages of the heretofore-known devices and methods of this general type and which allow the flanged disk to be pressed onto the spring ring to the necessary extent even in the case of a very hard, more or less non-elastically deformable support.

With the foregoing and other objects in view there is provided, in accordance with the invention, a roller, comprising:
 a roller body having a central bore formed therein and having a peripheral surface formed with a circumferential groove;
 a bearing disposed in the central bore;
 two flanged disks and a substantially non-elastically deformable, annular support disposed between the two flanged disks on the peripheral surface of the roller body;
 a resilient insert disposed between the annular support and at least one of the flanged disks; and
 a spring ring disposed in the circumferential groove and releasably retaining one of the flanged disks on the roller body.

In other words, the objects of the invention are achieved in that a resilient insert is arranged between the support and at least one of the flanged disks.

In the preferred embodiment the roller is a roller of a running-gear mechanism or of a roller battery in a cableway system. In that case, the virtually non-elastic insert is formed to support the roller on a cable of a cableway system.

The support is installed here in that it is pushed onto the roller body in the axial direction, in that, furthermore, the at least one resilient insert is arranged axially outside the support, in that, thereafter, the at least one flanged disk is pushed onto the roller body, likewise in the axial direction and counter to the action of the resilient insert, and in that, finally, a spring ring or the like is inserted into the encircling groove. Since the at least one resilient insert presses the flanged disk against the spring ring, the flanged disk is thus retained on the roller body.

In the case of a possible dismantling operation in order for it to be possible for the annular support to be exchanged, all that is required is for the spring ring or the like to be removed, whereupon the flanged disk can also be removed.

On its inside, at least one of the two flanged disks is preferably designed with a recess, undercut or the like, wherein the resilient insert is retained. According to a preferred embodiment, the resilient insert is formed by a rubber ring. In addition, along their radially inner borders, the flanged disks are preferably designed with recesses through which condensation can flow out.

In accordance with an added feature of the invention, at least one of the two flanged disks is formed with an undercut, or a recess, or the like, for receiving the resilient insert.

In accordance with an additional feature of the invention, the resilient insert is a rubber ring.

In accordance with another feature of the invention, the flanged disks are formed with openings along radially inner borders thereof, for an outflow of condensation.

In accordance with a concomitant feature of the invention, there are provided two circumferential grooves and each of the two flanged disks is removably retained on the roller body by a respective spring ring held in each of the two grooves.

In other words, the objects of the invention are achieved in that a resilient insert is arranged between the support and at least one of the flanged disks.

The support is installed here in that it is pushed onto the roller body in the axial direction, in that, furthermore, the at least one resilient insert is arranged axially outside the support, in that, thereafter, the at least one flanged disk is pushed onto the roller body, likewise in the axial direction and counter to the action of the resilient insert, and in that, finally, a spring ring or the like is inserted into the encircling groove. Since the at least one resilient insert presses the flanged disk against the spring ring, the flanged disk is thus retained on the roller body.

In the case of a possible dismantling operation in order for it to be possible for the annular support to be exchanged, all that is required is for the spring ring or the like to be removed, whereupon the flanged disk can also be removed.

On its inside, at least one of the two flanged disks is preferably designed with a recess, undercut or the like, wherein the resilient insert is retained. According to a preferred embodiment, the resilient insert is formed by a rubber ring. In addition, along their radially inner borders, the flanged disks are preferably designed with recesses through which condensation can flow out.

Other features which are considered as characteristic for the invention are set forth in the appended claims.

Although the invention is illustrated and described herein as embodied in a roller for a running-gear mechanism or for a roller battery, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
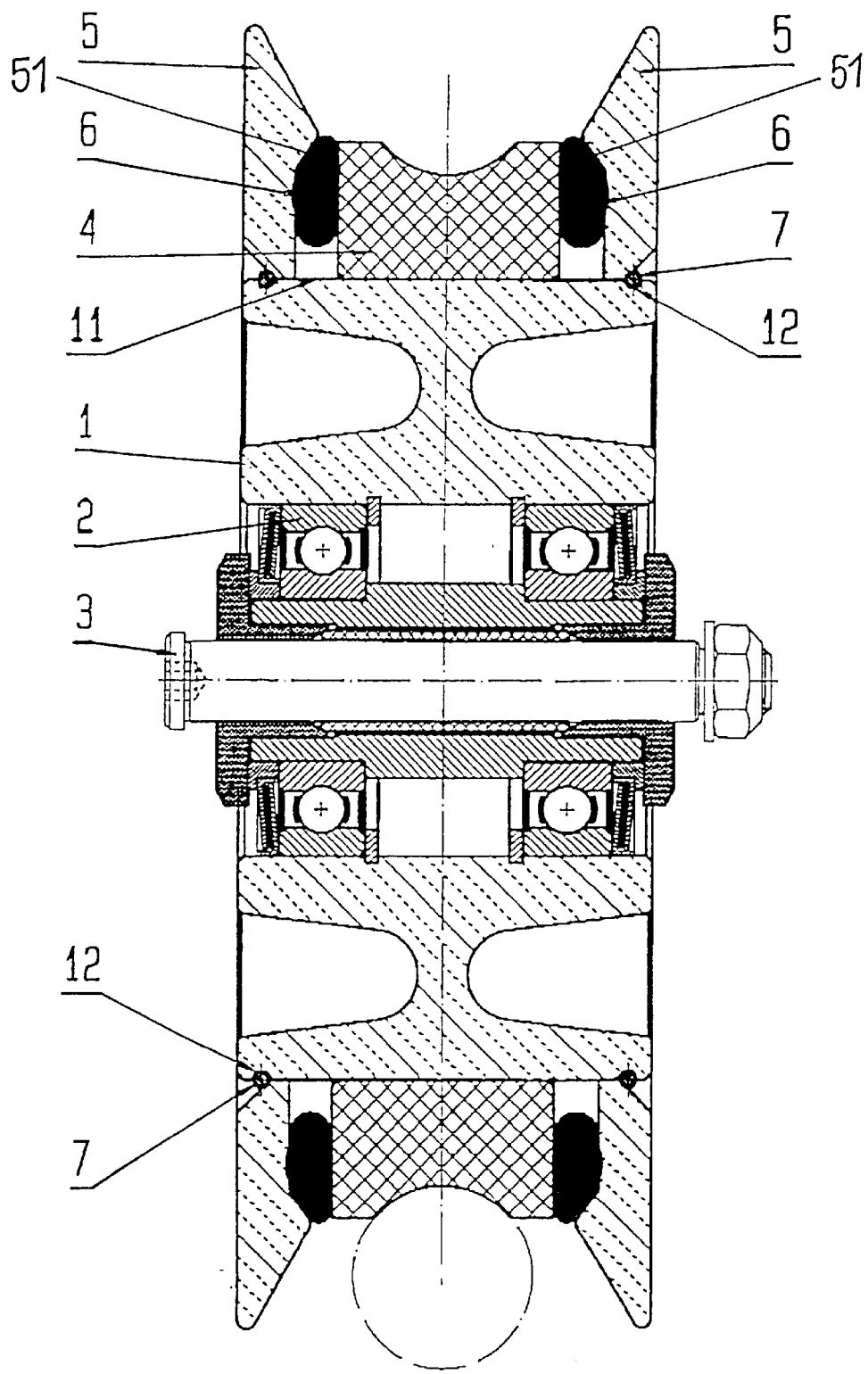
FIG. 1 is an axial section of a roller according to the invention.

Referring now to the figures of the drawing in detail and first, particularly, to FIG. 1 thereof, there is shown a roller according to the invention that comprises a roller body 1 which is formed with a central bore. A bearing 2 is inserted in the central bore, and a bearing bolt 3 passes through the bearing 2. Since these components are known from the prior art, they will not be explained in any more detail.

The roller body 1 is formed with a cylindrical outer surface 11 on which an annular support 4 for a load-bearing cable or a traction cable is located. The support 4 is produced from a very hard and compression-resistant and also virtually non-elastically deformable plastic material. Two flanged disks 5 are located axially outside the support 4. Furthermore, resilient inserts, e.g. rubber rings 6, are provided between the support 4 and the flanged disks 5. The outer surface 11 of the roller body 1 is formed with in each case one encircling groove 12 in the vicinity of the two end surfaces. A spring ring 7 or snap ring 7 is inserted into the groove 12. Furthermore, on their inside, the flanged disks 5 are formed with an undercut 51 or the like, wherein the respectively associated rubber ring 6 is retained.

FIG. 1 illustrates the roller in its assembled state. In this case, the flanged disks 5 are pressed axially onto the spring rings 7 by the resilient inserts 6, as a result of which they are retained in their position.

Figure 2:
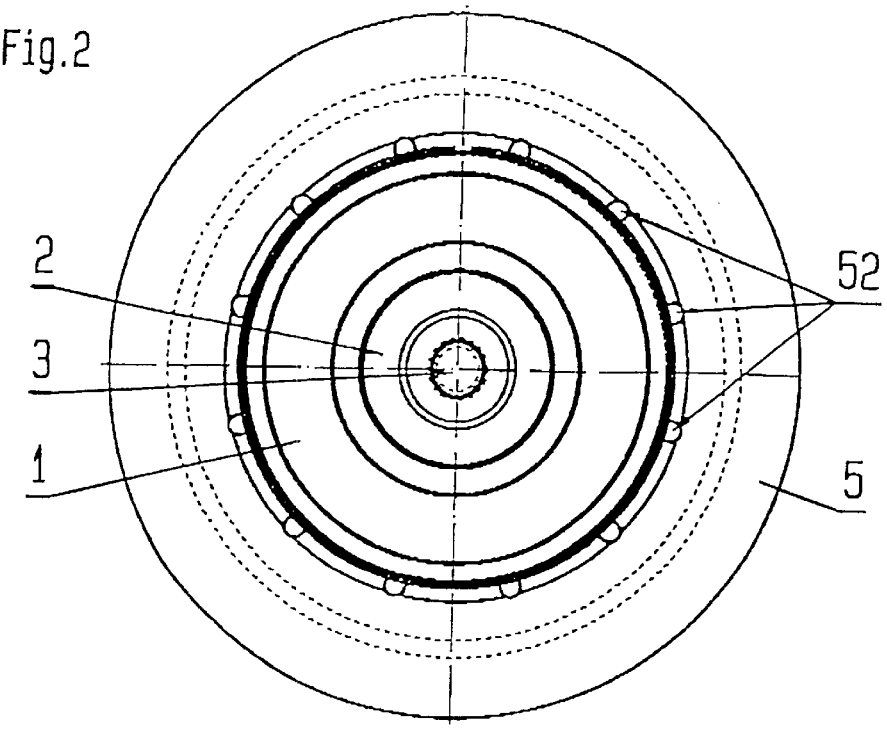
FIG. 2 is a plan view, on a smaller scale than FIG. 1, of the flanged disk according to FIG. 1.

As can be seen from FIG. 2, on their inner borders, the flanged disks 5 are formed with a multiplicity of bores 52, which serve for allowing condensation flow out of the region of the support 4.

Figure 3:
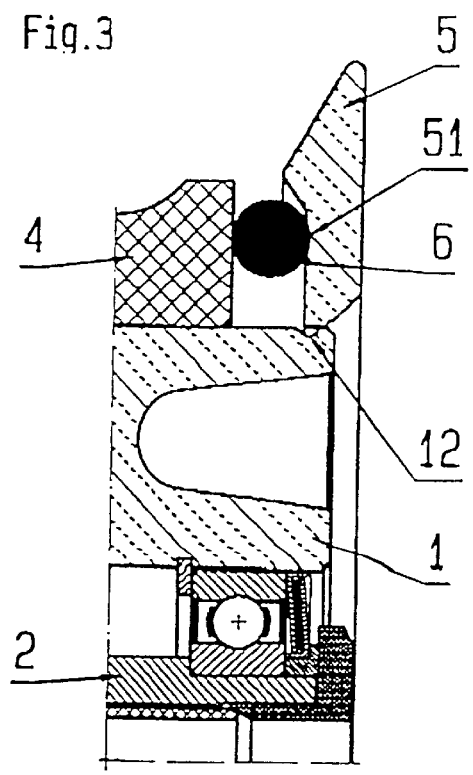
FIG. 3 is a sectional detail of the roller of FIG. 1 during the operation of installing one of the two flanged disks.
Figure 4:
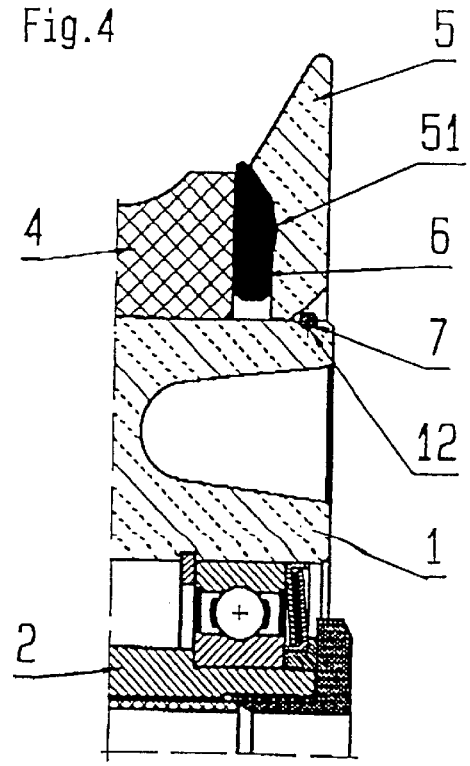
FIG. 4 is a similar view of the detail of FIG. 3, at the end of the installation operation.

The assembly operation is explained hereinbelow with reference to FIGS. 3 and 4:

One of two flanged disks 5 is located on the roller body 1. A first rubber ring 6, the annular support 4, a second rubber ring 6 and the second flanged disk 5 are then pushed axially onto the roller body 1 with the first-mentioned flanged disk 5. In this case, the second flanged disk 5 is pushed on axially counter to the action of the rubber ring 6 until such time as the spring ring 7 can be inserted into the groove 12. The flanged disks 5 are pressed onto, i.e., biased against, the spring rings 7 under the action of the rubber ring 6, as a result of which they are retained on the roller body 1.

For a removal of one of the flanged disks 5, all that is required is for the latter to be displaced axially counter to the action of the rubber ring 6 until such time that the associated spring ring 7 is released. The support 4 can then be replaced by a new support 4.

The above-described invention provides a roller for cableway systems which can very straightforwardly be provided with a support made of a very hard and thus more or less non-elastically deformable material and in the case of which a no longer functional support can very straightforwardly be replaced by a new support.

I claim:

1. A roller, comprising:
    a roller body having a central bore formed therein and having a peripheral surface formed with a circumferential groove;
    a bearing disposed in said central bore;
    two flanged disks and a substantially non-elastically deformable, annular support disposed between said two flanged disks on said peripheral surface of said roller body;
    a resilient insert disposed between said annular support and at least one of said flanged disks; and
    a spring ring disposed in said circumferential groove and releasably retaining one of said flanged disks on said roller body.

2. The roller according to claim 1, wherein at least one of said two flanged disks is formed with an undercut for receiving said resilient insert.

3. The roller according to claim 1, wherein at least one of said two flanged disks is formed with an recess for receiving said resilient insert.

4. The roller according to claim 1, wherein said resilient insert is a rubber ring.

5. The roller according to claim 1, wherein said flanged disks are formed with openings along radially inner borders thereof, for an outflow of condensation.

6. The roller according to claim 1, wherein said circumferential groove is one of two grooves and each of said two flanged disks is removably retained on said roller body by a respective said spring ring held in a respective said groove.

7. The roller according to claim 1 formed as a roller of a running-gear mechanism.

8. The roller according to claim 1 formed as a roller of a roller battery in a cableway system.

9. The roller according to claim 1, wherein said insert is configured to support the roller on a cable of a cableway system.

* * * * *